(12) United States Patent
Lin

(10) Patent No.: US 11,833,433 B2
(45) Date of Patent: Dec. 5, 2023

(54) ONLINE VIRTUAL NARRATION METHOD AND DEVICE, AND MEDIUM

(71) Applicant: TENCENT TECHNOLOGY (SHENZHEN) COMPANY LIMITED, Shenzhen (CN)

(72) Inventor: Shaobin Lin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 72 days.

(21) Appl. No.: 17/580,553

(22) Filed: Jan. 20, 2022

(65) Prior Publication Data

US 2022/0143510 A1    May 12, 2022

Related U.S. Application Data

(63) Continuation of application No. PCT/CN2020/128018, filed on Nov. 11, 2020.

(30) Foreign Application Priority Data

Feb. 7, 2020    (CN) .......................... 202010082914.2

(51) Int. Cl.
*A63F 13/67*    (2014.01)
*A63F 13/537*    (2014.01)
(Continued)

(52) U.S. Cl.
CPC ............ *A63F 13/67* (2014.09); *A63F 13/537* (2014.09); *G06F 40/186* (2020.01); *G06V 20/44* (2022.01); *G06V 20/46* (2022.01)

(58) Field of Classification Search
CPC ...... A63F 13/67; A63F 13/537; G06F 40/186; G06V 20/46; G06V 20/44
See application file for complete search history.

(56) References Cited

U.S. PATENT DOCUMENTS 6,976,031 B1 * 12/2005 Toupal ................. G06F 40/186
                                                    707/999.009
8,688,434 B1 *  4/2014 Birnbaum .............. G06F 40/56
                                                    704/9
(Continued)

FOREIGN PATENT DOCUMENTS

CN           1759909 A        4/2006
CN         103927445 A        7/2014
(Continued)

OTHER PUBLICATIONS

The State Intellectual Property Office of the People's Republic of China (SIPO) Office Action 1 for for 202010082914.2 Feb. 5, 2021 12 Pages (including translation).
(Continued)

*Primary Examiner* — Steve Rowland
(74) *Attorney, Agent, or Firm* — ANOVA LAW GROUP, PLLC

(57) ABSTRACT

An online virtual narration method is provided. The online virtual narration method includes: acquiring, at least based on a frame image of a video being played, attribute data used for describing basic information of an element in the frame image; extracting, based on the attribute data, feature data used for representing comprehensive information related to narration in the frame image; generating candidate events based on the feature data; selecting a narration event from the generated candidate events; determining a corresponding narration text based on the selected narration event; and outputting corresponding narration content based on the narration text.

19 Claims, 9 Drawing Sheets

(51) Int. Cl.
*G06F 40/186* (2020.01)
*G06V 20/40* (2022.01)

(56) References Cited

U.S. PATENT DOCUMENTS

| | | | | |
|---|---|---|---|---|
| 8,892,417 | B1* | 11/2014 | Nichols | G06N 5/02 |
| | | | | 706/46 |
| 9,578,351 | B1* | 2/2017 | Bynoe | H04N 21/23424 |
| 10,300,394 | B1* | 5/2019 | Evans | A63F 13/86 |
| 2003/0139209 | A1* | 7/2003 | Nakayama | A63F 13/5258 |
| | | | | 463/6 |
| 2007/0233680 | A1* | 10/2007 | Carlson | G06F 16/242 |
| 2011/0107220 | A1* | 5/2011 | Perlman | A63F 13/30 |
| | | | | 715/720 |
| 2012/0071246 | A1* | 3/2012 | Thomas | A63F 13/10 |
| | | | | 463/43 |
| 2012/0316882 | A1* | 12/2012 | Fiumi | G10L 15/30 |
| | | | | 704/E15.001 |
| 2014/0031114 | A1* | 1/2014 | Davison | A63F 13/65 |
| | | | | 463/31 |
| 2014/0279731 | A1* | 9/2014 | Yakovenko | G06F 16/958 |
| | | | | 706/12 |
| 2016/0217325 | A1 | 7/2016 | Bose et al. | |
| 2016/0317933 | A1* | 11/2016 | Shoshan | A63F 13/422 |
| 2017/0128840 | A1* | 5/2017 | Croci | A63F 13/25 |
| 2017/0228600 | A1* | 8/2017 | Syed | G06V 20/62 |
| 2017/0270128 | A1* | 9/2017 | Smith | A63F 13/80 |
| 2020/0188799 | A1* | 6/2020 | Croci | A63F 13/828 |
| 2021/0110632 | A1* | 4/2021 | Nelson | G07F 17/3211 |

FOREIGN PATENT DOCUMENTS

| | | |
|---|---|---|
| CN | 107362538 A | 11/2017 |
| CN | 107707931 A | 2/2018 |
| CN | 108549486 A | 9/2018 |
| CN | 109145733 A | 1/2019 |
| CN | 111290724 A | 6/2020 |

OTHER PUBLICATIONS

The World Intellectual Property Organization (WIPO) International Search Report for PCT/CN2020/128018 dated Feb. 18, 2021 6 Pages (including translation).

* cited by examiner

ONLINE VIRTUAL NARRATION METHOD AND DEVICE, AND MEDIUM

RELATED APPLICATION(S)

This application is a continuation application of PCT Patent Application No. PCT/CN2020/128018 filed on Nov. 11, 2020, which claims priority to Chinese Patent Application No. 202010082914.2, entitled "ONLINE VIRTUAL NARRATION METHOD AND DEVICE, AND MEDIUM" filed on Feb. 7, 2020, all of which are incorporated by reference in entirety.

FIELD OF THE TECHNOLOGY

The present disclosure relates to the field of artificial intelligence (AI), and more particularly, to an online virtual narration method and device, and a medium.

BACKGROUND

With the development of artificial intelligence (AI) in various directions and different abilities, the public has gradually become dissatisfied that only certain AI ability can be applied in an actual scenario, and implementation scenarios of AI comprehensive abilities remain in active pursuit.

For example, a virtual host technology for a news broadcast scenario is proposed. A text that may be broadcast, a speech speed during broadcast, a speech emotion, and the like are prepared in advance. A text-to-speech (TTS) technology is used for converting the text into a voice that simulates a human voice, and human parameters such as a face expression parameter and an action parameter that are configured offline are converted into a human-like expression and action by using a 3D technology for display.

However, this news broadcast virtual host technology may only be applicable to offline scenarios. The broadcast content, voice effect and action effect of the virtual host may be fixed before the broadcast, and may not be applied to live online narration and broadcast host scenarios.

SUMMARY

It may be desirable to provide an online virtual narration method and device, and a medium, so that narration content can be outputted in real time and synchronously for a video currently being played.

In one aspect, the present disclosure provides an online virtual narration method, the method including: acquiring, at least based on a frame image of a video being played, attribute data used for describing basic information of an element in the frame image; extracting, based on the attribute data, feature data used for representing comprehensive information related to narration in the frame image; generating candidate events based on the feature data; selecting a narration event from the generated candidate events; determining a corresponding narration text based on the selected narration event; and outputting corresponding narration content based on the narration text.

In another aspect, the present disclosure provides an online virtual narration device, comprising: a memory storing computer program instructions; and a processor coupled to the memory and configured to execute the computer program instructions and perform: acquiring, at least based on a frame image of a video being played, attribute data used for describing basic information of an element in the frame image; extracting, based on the attribute data, feature data used for representing comprehensive information related to narration in the frame image; generating candidate events based on the feature data; selecting a narration event from the generated candidate events; determining a corresponding narration text based on the selected narration event; and outputting corresponding narration content based on the narration text.

In yet another aspect, the present disclosure provides a non-transitory computer-readable storage medium storing computer program instructions executable by at least one processor to perform: acquiring, at least based on a frame image of a video being played, attribute data used for describing basic information of an element in the frame image; extracting, based on the attribute data, feature data used for representing comprehensive information related to narration in the frame image; generating candidate events based on the feature data; selecting a narration event from the generated candidate events; determining a corresponding narration text based on the selected narration event; and outputting corresponding narration content based on the narration text.

By using the online virtual narration method and device according to the embodiments of the present disclosure, a problem of real-time online narration can be resolved. For a video (for example, an online game or a sports event) that is currently in progress, narration content may be outputted in real time and synchronously, and even a narration speech may be broadcast by a virtual narration host with a personification effect such as a corresponding expression or action.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DESCRIPTION OF EMBODIMENTS

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

Throughout the description, and when applicable, "some embodiment(s)" or "certain embodiment(s)" describe subsets of all possible embodiments, but it may be understood that the "some embodiment(s)" or "certain embodiment(s)" may be the same subset or different subsets of all the possible embodiments, and can be combined with each other without conflict.

In certain embodiments, the term "based on" is employed herein interchangeably with the term "according to."

Figure 1A:
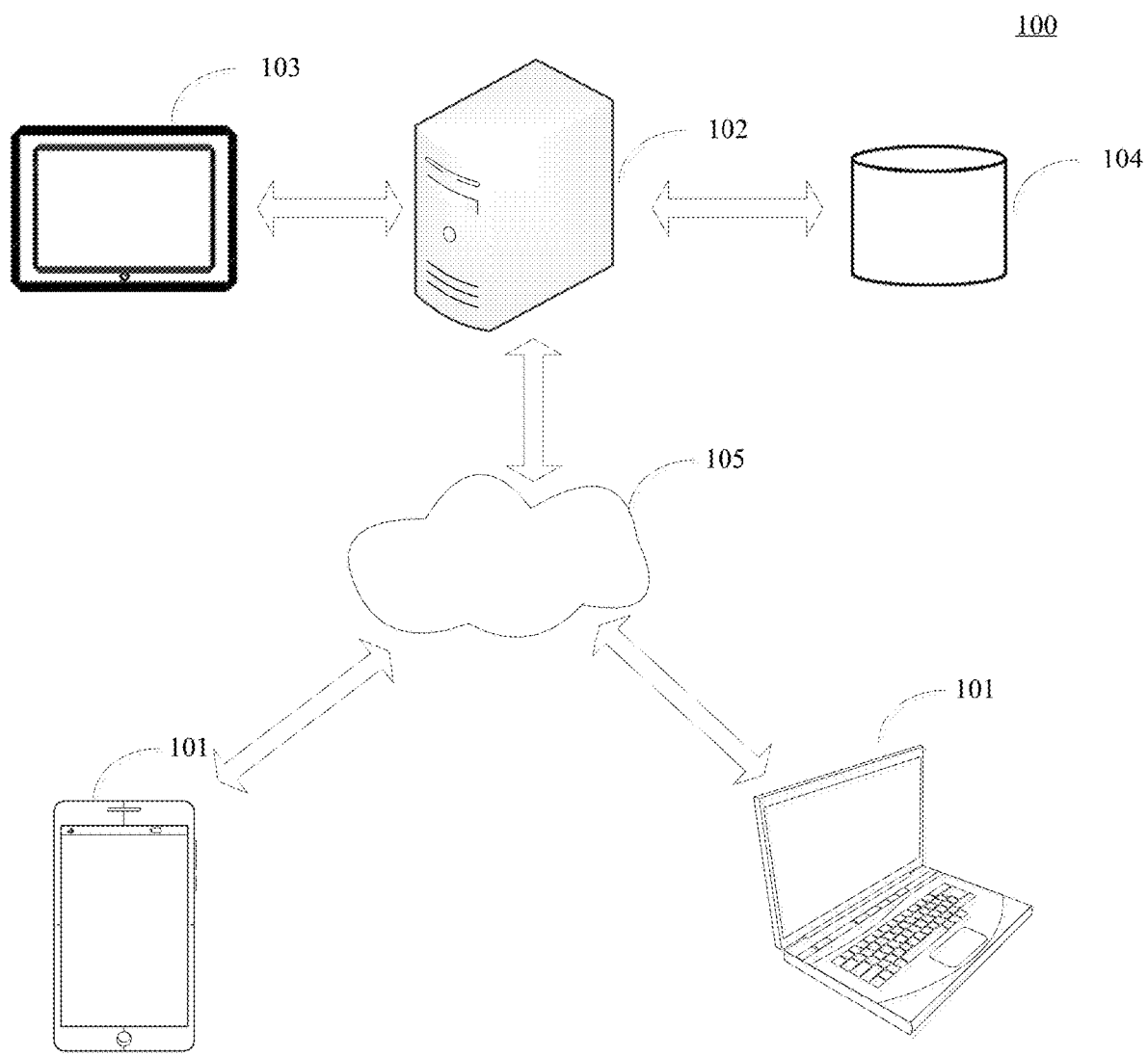
FIG. 1A is a schematic diagram of an implementation environment of an online virtual narration method according to embodiment(s) of the present disclosure.

FIG. 1A is a schematic diagram of an implementation environment of an online virtual narration method according to an embodiment of the present disclosure. As shown in FIG. 1, the method is applied to a communications system 100, and the communications system 100 includes one or more terminal devices 101, a server 102, a video data acquiring device 103, and a database 104. The terminal device 101 and the server 102 are connected by using a network 105, for example, are connected by using a wired or wireless network.

In the embodiment shown in FIG. 1, the video data acquiring device 103 may acquire a frame image of a video being played, and send the acquired frame image to the server 102. The server 102 narrates the received frame image according to reference feature data stored in the database 104, and outputs narration content to the terminal device 101 by using the network 105. The terminal device 101 may display the narration content to a user.

The server 102 may be a single server, or a server cluster including a plurality of servers, or a cloud computing platform, or the like. The server 102, the video data acquiring device 103, and the database 104 may be independent devices, or may be one device. The terminal device 10 may be a mobile phone, a tablet computer, a notebook computer, a personal computer (PC), a smart TV, or the like.

Figure 1B:
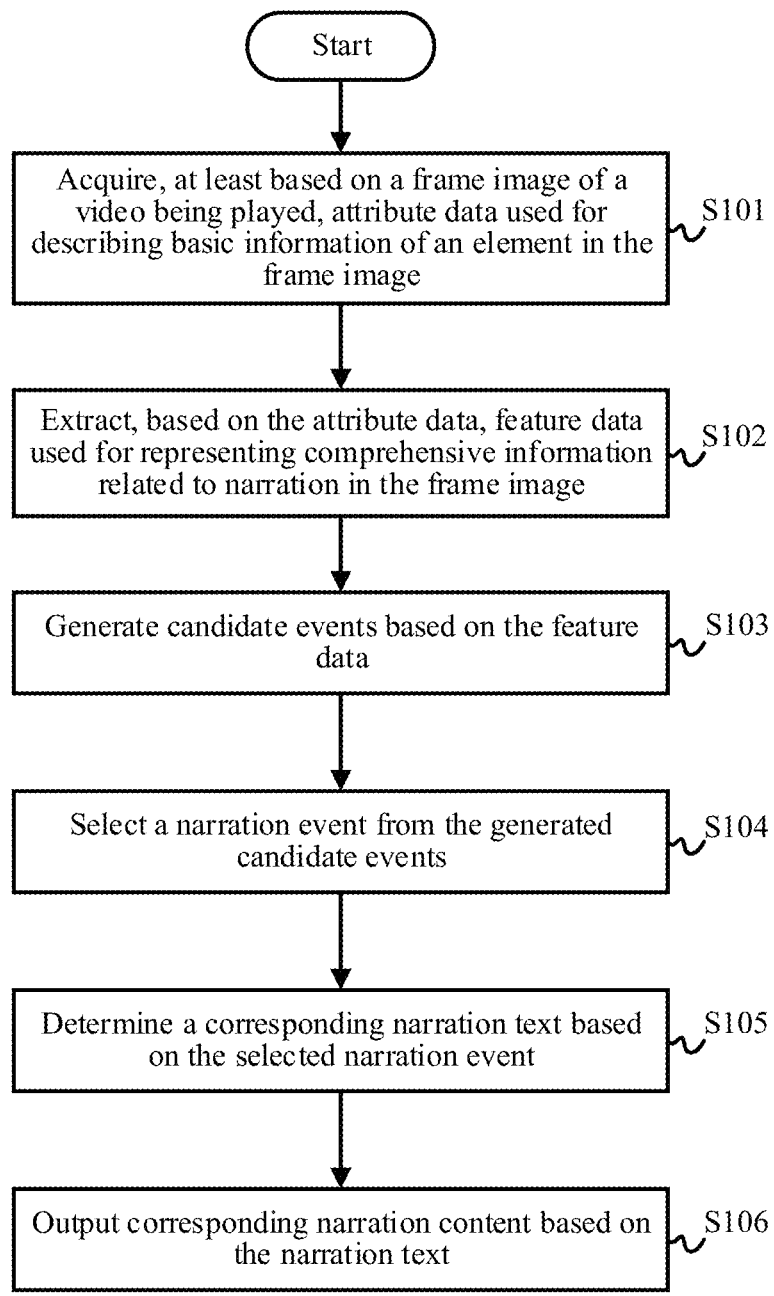
FIG. 1B is a flowchart of a process of an online virtual narration method according to embodiment(s) of the present disclosure.

An online virtual narration method according to an embodiment of the present disclosure is described with reference to FIG. 1B. As shown in FIG. 1B, the method includes the following steps S101-S106.

First, in step S101, acquire, at least based on a frame image of a video being played, attribute data used for describing basic information of an element in the frame image.

For example, the online virtual narration method according to this embodiment of the present disclosure may be applied to a scenario of online game virtual narration. In this implementation, the video being played is a video of an online game. A game player may input a game instruction to the online game to control, when the game is being performed, movement, skills, and actions of elements such as a player role and a non-player role. In addition, in this implementation, the acquiring, at least based on a frame image of a video being played, attribute data used for describing basic information of an element in the frame image further includes: acquiring, based on the frame image of the video being played and a frame instruction (such as the game instruction) inputted for the frame image, the attribute data used for describing the basic information of the element in the frame image.

For example, the attribute data includes direct attribute data and indirect attribute data. The acquiring, at least based on a frame image of a video being played, attribute data used for describing basic information of an element in the frame image may further include: acquiring direct attribute data of an element in a current frame image in a current frame. Herein, the direct attribute data is automatically generated by a game application. For example, the direct attribute data may include a coordinate position of a game role in an image. Then, the indirect attribute data is determined by performing analysis processing on the direct attribute data of the element in the current frame image in the current frame. That is, the indirect attribute data is data further calculated based on the direct attribute data. For example, in the example, when or in response to determining the direct attribute data includes the coordinate position of the game role in the image, indirect attribute data of "the game role in the jungle" may be obtained by comparing the coordinate position of the game role with a coordinate position of the jungle. The jungle is an area on a map set in a game application, and belongs to an activity range of a neutral third-party game role. In another implementation, based on the direct attribute data, the indirect attribute data may be obtained by understanding the game instruction. For example, if a game player inputs a game instruction for movement, based on a current coordinate position of a game role corresponding to the game player, a new coordinate position of the game role in the map after the game role moves may be calculated. Alternatively, for another example, if the game player inputs a game instruction for applying a spell, the remaining spell cooling time of the game role corresponding to the game player after the spell is applied may be calculated based on the current time.

In one implementation, in addition to considering only the direct attribute data of the current frame image, the indirect attribute data may be further acquired with reference to direct attribute data of images of one or more previous frames. In certain embodiment(s), the acquiring, at least based on a frame image of a video being played, attribute data used for describing basic information of an element in the frame image may further include: acquiring direct attribute data of an element in a current frame image in a current frame and a previous frame; and determining indirect attribute data by performing analysis processing on the direct attribute data of the element in the current frame image in the current frame and the previous frame. Herein, the previous frame is a frame that precedes the current frame in a time sequence, and a quantity of previous frames may be one or more. For example, the direct attribute data may include information boxes in game images in the current frame and the previous frame. By performing image analysis processing on the information boxes, hit point data of the game role in the game images in the current frame and the previous frame may be obtained, and the hit point data in the game image in the current frame is compared with the hit point data in the game image in the previous frame to determine indirect attribute data of "a hit point change amount of the game role".

For another example, the online virtual narration method according to this embodiment of the present disclosure may also be applied to a scenario of sports event virtual narration. In this implementation, the video being played is an ongoing sports event. Unlike an online game, a sports event may not receive an input from a user, that is, no inputted game instruction exists in each frame, and the sports event may be considered as an automatically played video. In addition, for each frame image, attribute data of an element in the image is obtained based on only the frame image. For example, when or in response to determining the ongoing sports event is a basketball game, the direct attribute data may include a coordinate position of a player in a frame image. By comparing the coordinate position of the player with a coordinate position of each area of a basketball court, indirect attribute data of "the player is in the front court" can be obtained.

It may be learned that, in step S101, for the attribute data obtained at least based on the frame image of the video being played, both the directly acquired direct attribute data and the indirect attribute data obtained through further analysis based on the directly acquired direct attribute data are data used for describing basic information in a single dimension.

Then, in step S102, extract, based on the attribute data, feature data used for representing comprehensive information related to narration in the frame image. Herein, the direct attribute data and the indirect attribute data that are obtained based on the frame image may be reused for extracting different types of feature data. That is, when different feature data is extracted, some of the used attribute data may be the same.

In certain embodiment(s), the extracting, based on the attribute data, feature data used for representing comprehensive information related to narration in the frame image may further include: selecting, from the attribute data, attribute data associated with each feature included in a pre-established narration feature library. For example, attribute data associated with a feature "whether in the grass" included in the narration feature library is coordinates of a game role and coordinates of the grass. The grass herein is a plant in a game application, and can be used for hiding the game role. Then, a value of the feature is determined as the feature data of the frame image by performing analysis processing on the attribute data associated with the feature. For example, by comparing the coordinates of the game role with the coordinates of the grass, it is determined that the value of the feature "whether in the grass" is "in the grass" or "not in the grass".

The following describes in detail a method for constructing a narration feature library.

A forward narration process is from attribute data to feature data, and then from the feature data to a narration event. However, the narration feature library is established based on a reverse narration process, that is, the narration feature library is gradually established and improved through disassembly from an event to a feature and then from the feature to an attribute for the narration event involved in the narration process, and by applying prior annotation and mining.

Figure 2:
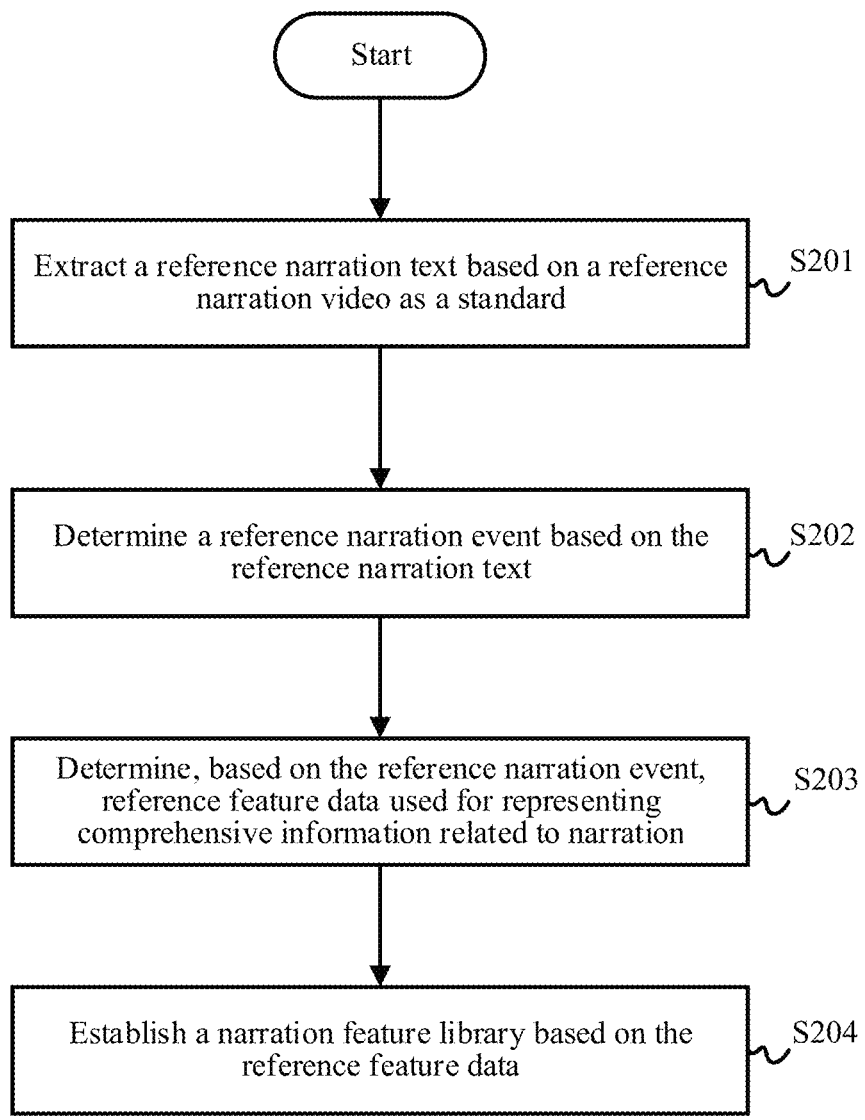
FIG. 2 is a flowchart of a process of establishing a narration feature library according to embodiment(s) of the present disclosure.

A process of establishing the narration feature library is described with reference to FIG. 2. As shown in FIG. 2, the method for establishing the narration feature library includes the following steps S201-S204.

First, in step S201, extract a reference narration text based on a reference narration video as a standard.

Herein, the reference narration video as the standard may be a video that has been manually narrated, such as a game video or a sports event. That is, in the reference narration video, outputted narration content is already included. It is expected to reversely derive, based on the existing reference narration video, which features are concerned in the narration process. Generally, in practice, a plurality of reference narration videos will be selected as standards. The more the selected reference narration videos are, the more complete the features included in the established narration feature library.

In addition, the established narration feature library is in a one-to-one correspondence with a specific type of a to-be-narrated video. For example, a narration feature library used for an online game and a narration feature library used for a sports event are necessarily different. In addition, in an implementation scenario of online game virtual narration, narration feature libraries corresponding to different types of online games are also different.

In certain embodiment(s), in step S201, first, a narration audio may be extracted from the reference narration video, and then the extracted narration audio is converted into a reference narration text. For example, the extracted reference narration text is "Shen Mengxi threw a hybrid bomb, causing huge damage. I really admire him."

Then, in step S202, determine a reference narration event based on the reference narration text. As shown in the example, based on the reference narration text "Shen Mengxi threw a hybrid bomb, causing huge damage. I really admire him.", it can be determined that reference narration events are "Shen Mengxi threw a bomb" and "the bomb causes huge damage".

Next, in step S203, determine, based on the reference narration event, reference feature data used for representing comprehensive information related to narration. For example, based on the reference narration event of "Shen Mengxi threw a bomb", reference feature data of "a name of a game role" and "an action of a game role" can be determined. Based on the reference narration event of "the bomb causes huge damage", reference feature data of "damage output to another game role" can be determined.

Finally, in step S204, establish the narration feature library based on the reference feature data.

A combination of manual annotation and automatic annotation may be used for determining the reference narration event from the reference narration text and to determine the reference feature data from the reference narration event. In certain embodiment(s), first, event extraction and feature annotation are performed on a batch of reference narration videos in a manual annotation manner, so as to initially establish the narration feature library. Then, a new batch of reference narration videos are used for replacement, and the new batch of reference narration videos are automatically annotated to perform event extraction and feature annotation. After automatic annotation, error correction and supplement are performed through manual check, so as to further expand and improve the narration feature library. In such alternate manual and automatic manners, a new reference narration video is constantly used for replacement. As processing progresses, fewer manual error correction and supplement parts will be found. When manual error correction and supplement parts are no longer present, this means that the narration feature library is generated and can be used in feature extraction of online virtual narration.

Because the narration feature library includes a large quantity of feature data, the feature data is classified into different categories for ease of retrieval and management. For example, FIG. 3 is a schematic diagram of an example of feature classification included in a narration feature library in an implementation scenario of an online game according to an embodiment of the present disclosure.

Figure 3:
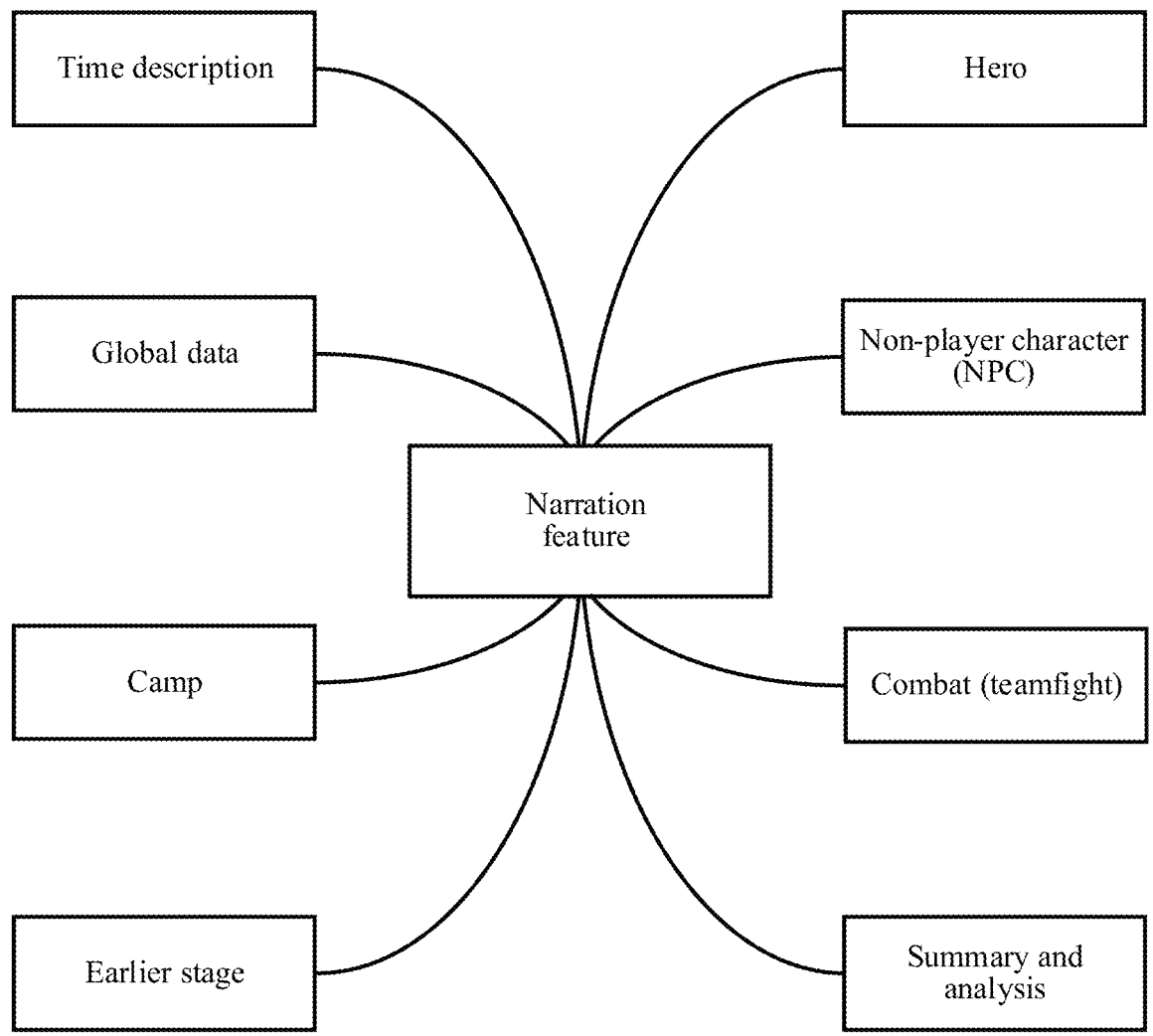
FIG. 3 is a schematic diagram of an example of feature classification included in a narration feature library in an implementation scenario of an online game according to embodiment(s) of the present disclosure.

As shown in FIG. 3, narration features include a hero, a non-player character (NPC), a battle (teamfight), summary and analysis, a time description, global data, a camp, an earlier stage, and the like. Hero features are related to a hero status (hit point, position, and the like), an action (spell, a movement position, and the like). NPC features are related to a status (hit point, position, and the like) and an action (attacking a hero, attacking a tower, birth, and the like) of a non-player character in the game. Combat features are related to attributes of a multi-to-multi-teamfight (start and end times, team hero, end result, and effect) formed by heroes in the game. Summary and analysis features are statistics and analysis of a current game situation. The time description is to divide a current game stage (earlier, middle and later stages). Global data features are overall data statistics of the game (for example, a hero of the first view angle of the game, the position and range of the game view, and game execution time). Camp features are attribute statistics on dimensions of two camps (economy of the camp, status of the camp tower, and the situation of killing wild monsters in the camp). Earlier stage features are an opening introduction to game narration (beginning, narration guidance, introduction to the battle array, and off-site background).

It can be learned that feature data of each category is calculated based on attribute data, which is a key to feature extraction.

In addition, it may be desirable to balance feature data included in the narration feature library and the quantity of the feature data included in the narration feature library. If the narration feature library includes as many categories and as much feature data as possible, a problem of omitting an event will not occur, but a computation amount generated for each frame of event will be greatly increased. If the narration feature library includes only a small quantity of key feature data, and an event generated based on these key feature data is to be selected as a narration event with a large probability, this greatly reduces a computation amount generated for each frame of event and improves real-time narration performance. Selection of the key feature data may be determined according to a specific narration scenario and depends on a plurality of experiments.

Figure 4:
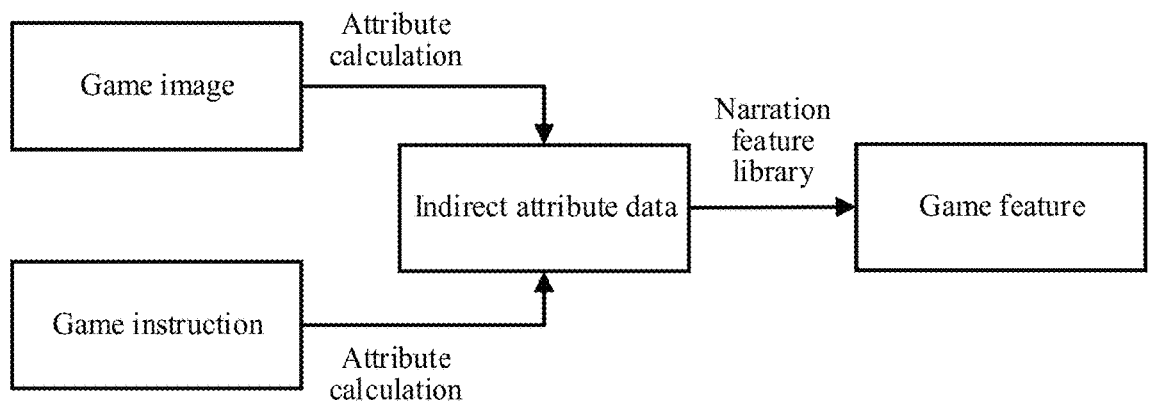
FIG. 4 is a schematic diagram of a data flow diagram used for feature extraction in an implementation scenario of online game virtual narration according to embodiment(s) of the present disclosure.

FIG. 4 is a schematic diagram of a data flow diagram used for feature extraction in an implementation scenario of online game virtual narration according to an embodiment of the present disclosure. As shown in FIG. 4, based on a game image and a game instruction, indirect attribute data may be generated through calculation by using a real-time intra-game element attribute, and then a game feature may be extracted with reference to a narration feature library established for game narration.

Figure 5:
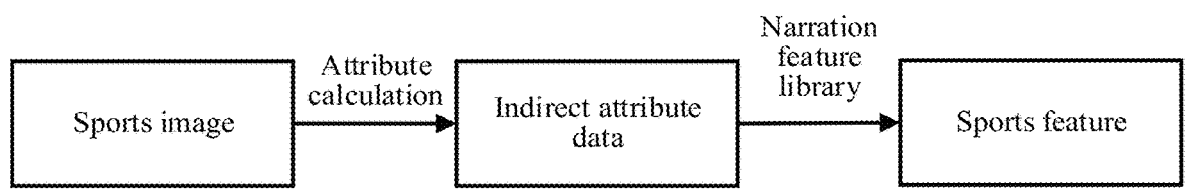
FIG. 5 is a schematic diagram of a data flow diagram used for feature extraction in an implementation scenario of sports event virtual narration according to embodiment(s) of the present disclosure.

FIG. 5 is a schematic diagram of a data flow diagram used for feature extraction in an implementation scenario of sports event virtual narration according to an embodiment of the present disclosure. As shown in FIG. 5, different from FIG. 4, based on a sports image, indirect attribute data may be generated through calculation by using an element attribute in a real-time image. Then, with reference to a narration feature library established for sports event narration, a sports feature may be extracted.

Next, referring back to FIG. 1B, in step S103, generate candidate events based on the feature data. The candidate events are events that occur in a video playback process. The candidate events generated herein are not necessarily all events that occur in the video playback process. Which candidate events are generated depends on which feature data has been extracted. In addition, not all the generated candidate events may be narrated.

In certain embodiment(s), the generating candidate events based on the feature data further includes: loading conditions corresponding to predefined events. One event may correspond to one or more conditions. For example, an event that "a hero is killed by a wild monster" may be corresponding to two conditions: C1. a hero is dead; and C2. killed by the wild monster. An event is generated as a candidate event when or in response to determining, based on the feature data, that a condition corresponding to the event is met. For example, if a value of the extracted feature data indicates that a hero state is alive or a killer category is another hero, that is, the condition C1 and the condition C2 are not met at the same time, an event that "a hero is killed by a wild monster" will not be generated. If the value of the extracted feature data indicates that the hero state is killed and the killer category is a wild monster, that is, both the condition C1 and the condition C2 are met, an event that "a hero is killed by a wild monster" is generated, and the event is used as a candidate event.

In this manner, conditions corresponding to predefined events are traversed, and events whose corresponding conditions are met are generated.

When implementation complexity of an event is relatively high, a quantity of conditions and feature data corresponding to the event increases. Therefore, in certain embodiment(s), from a perspective of implementation complexity, the candidate events are divided into a basic event and an advanced event. The event listed above that "a hero is killed by a wild monster" is a basic event. The basic event is generated based on the feature data. An advanced event is defined relative to a basic event. An advanced event may be generated based on a basic event or may be generated based on a basic event and the feature data.

Because an advanced event can be combined by basic events, for those events with complex features and many conditions, they can be easily combined by basic events, which can not only avoid a problem of splitting into many game features, but also increase reuse rates of some or all events.

An advanced event H1 is described as an example that a support squats in the grass bush behind a tyrant and assists a jungle in attacking the dragon from a perspective of the jungle. In a game implementation, the support, tyrant, and jungle in this event may be considered as game roles or game role occupations. For this advanced event, game features that are split directly include: F1. hero occupation—support, F2. tyrant state—attacked, F3. tyrant attacker occupation—jungle, and F4. support hero position—grass bush behind the tyrant. Previously, the following basic events have been defined and extracted: E1. a support squats in the grass bush behind a tyrant, and E2. a jungle hero is attacking the tyrant. Therefore, the advanced event H1 may be directly formed based on a combination of the basic events E1+E2, instead of defining a lengthy combination of F1, F2, F3, and F4, and performing a plurality of times of condition determining.

Figure 6:
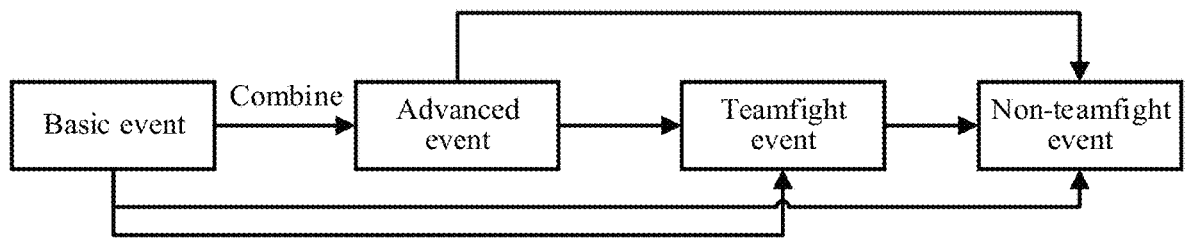
FIG. 6 is a schematic diagram of a data flow diagram of event generation in an implementation scenario of online game virtual narration according to embodiment(s) of the present disclosure.

In the foregoing, events are divided into basic events and advanced events from a perspective of implementation complexity. There may be another manner of dividing the events. For example, FIG. 6 is a schematic diagram of a data flow diagram of event generation in an implementation scenario of online game virtual narration according to an embodiment of the present disclosure. As shown in FIG. 6, in addition to a basic event and an advanced event, from a perspective of an event feature, candidate events may be further divided into a teamfight event and a non-teamfight event. In certain embodiment(s), the teamfight event is a set of candidate events in which a plurality of game roles participate in a predetermined time period before a current frame, and the non-teamfight event is an event other than the teamfight event. The teamfight event and the non-teamfight event may be basic events, or may be advanced events.

Figure 7:
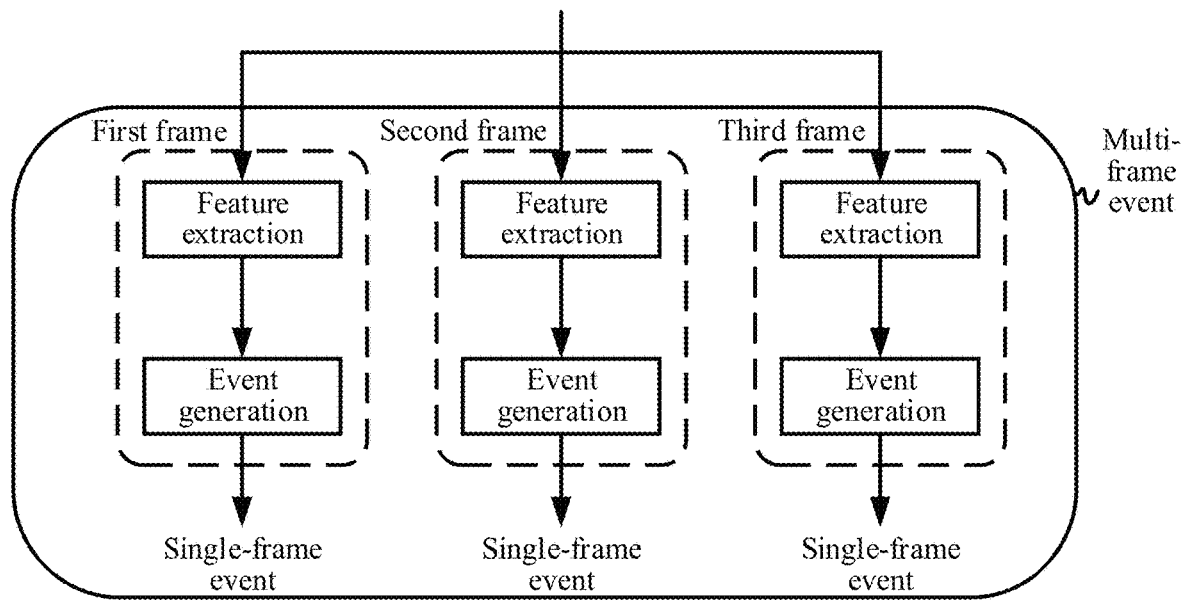
FIG. 7 is a schematic diagram of a relationship between a single-frame event and a multi-frame event according to embodiment(s) of the present disclosure.

In addition, in terms of a time span of an event, the events may be divided into a single-frame event and a multi-frame event. FIG. 7 is a schematic diagram of a relationship between a single-frame event and a multi-frame event according to an embodiment of the present disclosure. A single-frame event is an event obtained based on one frame image, and a multi-frame event is a set of a plurality of single-frame events. In FIG. 7, a single-frame event generation process is shown by using an example in which the first frame image, the second frame image, and the third frame image are used. In addition, the multi-frame event includes three single-frame events generated based on the first frame image, the second frame image, and the third frame image. However, a person skilled in the art may understand that the present disclosure is not limited thereto. The multi-frame event may have any quantity of single-frame events. In addition, the teamfight described above is performed based on a period of time in a game, game data exists in a form of a frame, and one game time period includes a plurality of game frames. Therefore, a teamfight event may be considered as a multi-frame event.

For each game frame, the feature extraction and event generation procedure is performed. In addition, some or all the generated events are used as candidate events to input a subsequent event selection process, which is described in detail below.

Then, referring back to FIG. 1B, in step S104, select a narration event from the generated candidate events. That is, only some of the candidate events are selected as narration events, and are narrated.

In certain embodiment(s), the selecting a narration event from the generated candidate events may further include: selecting the narration event based on a playback status of the video. For example, to enhance spot effects of narration, the generated candidate events include an operation event to supplement an introduction to a video currently being played (for example, a game introduction or a sports event introduction), a news narration opening event, and the like. This type of event may be played during a time period (such as game loading, game pause, and halftime during a sports event) that is not related to narration. Therefore, when the playback status of the video is game pause or halftime during a sports event, an operation event is selected from the candidate events as a narration event (operation selection).

In addition to the event selection basis, the narration event may be selected in the following manner. In certain embodiment(s), the selecting a narration event from the generated candidate events further includes: determining degrees of importance of the generated candidate events according to a predetermined rule. A candidate event with the highest degree of importance is selected as the narration event. For example, in an implementation scenario of online sports event virtual narration, when a position in which a sports event occurs is in a central area of a picture, it is considered that importance of the candidate event is high. Alternatively, when the sports event causes a score change, it is considered that the candidate event is of high importance.

In addition, in an implementation scenario of online game virtual narration, the narration event may be selected in the following manner. As described above, the candidate events include a teamfight event and a non-teamfight event. The selecting a narration event from the generated candidate events further includes: determining a degree of importance of each teamfight event according to a predetermined rule when or in response to determining that a plurality of teamfight events exist in the predetermined time period, for example, based on a position of a participating game role, there are teamfight events in a region A, a teamfight in a region B, and a teamfight in a region C in the predetermined time period. Then, select a teamfight event with the highest degree of importance (teamfight selection). For example, a teamfight event bringing the largest quantity of kills has the highest degree of importance. Alternatively, a teamfight event applying the largest quantity of spells has the highest degree of importance. Alternatively, a teamfight event that appears in a narration field of view has the highest degree of importance. Next, determine, according to a predetermined rule, a degree of importance of each candidate event included in the selected teamfight event; and select a candidate event with the highest degree of importance as the narration event (intra-team selection). For example, a score weighting may be performed according to a static weight of an event (for example, whether a game role is in the C position) and a dynamic weight of an event (for example, whether an event appears in a narration field of view, a result of a teamfight, and a spell effect), and an intra-team event with the highest score is selected as the narration event.

In addition, when or in response to determining that no teamfight event exists, an event with the highest static weight may be directly selected from single-frame events as the narration event (out-of-team selection).

The predetermined rule is not limited to the examples. Any other possible rules shall also be included within the scope of the present disclosure.

Figure 8:
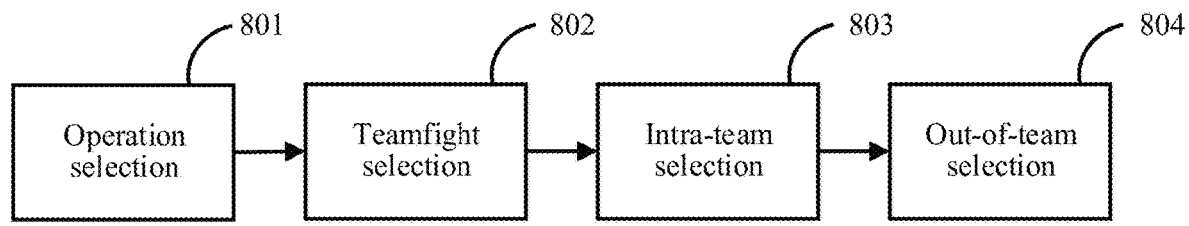
FIG. 8 is a schematic diagram of a data flow diagram of event selection in an implementation scenario of online game virtual narration according to embodiment(s) of the present disclosure.

FIG. 8 is a schematic diagram of a data flow diagram of event selection in an implementation scenario of online game virtual narration according to an embodiment of the present disclosure. As shown in FIG. 8, for some or all candidate events, a narration event may be selected in a sequence of operation selection 801, teamfight selection 802, intra-team selection 803, and out-of-team selection 804. First, determine whether a playback status of a current game is game loading, game pause, or the like. If yes, select an operation event. If no, further perform teamfight selection and intra-team selection. If there is no teamfight, perform out-of-team selection.

Next, referring back to FIG. 1B, in step S105, determine a corresponding narration text based on the selected narration event. That is, after an event that may be narrated is determined, a narration word of the corresponding event may be generated.

In certain embodiment(s), the determining a corresponding narration text based on the selected narration event further includes the following steps.

First, determine, based on a pre-established narration text library, a narration template corresponding to the selected narration event. The narration text library is essentially a set of (events, narration templates), and includes some or all narration stem content and a narration event corresponding to each of the narration templates. For example, a narration template [M1. <Hero Name>, do not worry. Take your medicine and save your strength.] corresponds to a narration event [E1. A hero uses a hit point supplement spell].

In certain embodiment(s), the term "pre-established narration text library" is interchangeable with the term "narrative text library."

Then, replace a template field in the narration template based on attribute data corresponding to the narration event, and generate the narration text. For example, the attribute data acquired in the feature extraction process described above and a hero name-A Ke, are dynamically used for replacement to obtain the narration text.

Finally, in step S106, output corresponding narration content based on the narration text. The narration content herein may be a text, may be an audio, or may be a video.

In certain embodiment(s), the outputting corresponding narration content based on the narration text further includes one or more of the following processing: outputting the narration text (subtitle narration); outputting a voice for broadcasting the narration text (audio narration); displaying a virtual image, and outputting a voice that cooperates with the virtual image to broadcast the narration text (virtual host video narration); and displaying a virtual image, and broadcasting the narration text by using an action of the virtual image (virtual host video narration), such as a sign language broadcast.

Figure 9:
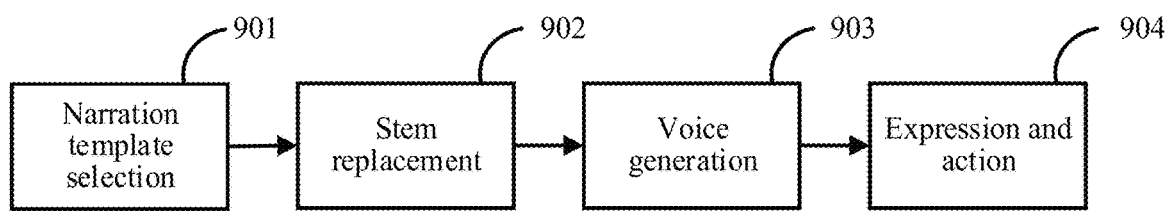
FIG. 9 is a schematic diagram of an example of a data flow diagram generated according to narration content according to embodiment(s) of the present disclosure.

FIG. 9 is a schematic diagram of an example of a data flow diagram generated according to narration content according to an embodiment of the present disclosure. As shown in FIG. 9, based on the narration event determined in the previous processing, determine, based on a pre-established narration text library, a narration template corresponding to the selected narration event (narration template selection 901). Then, replace a template field in the narration template based on attribute data corresponding to the narration event, and generate the narration text (stem replacement 902). Next, generate a corresponding voice (voice generation 903) and expression action (expression action 904) based on the narration text. For example, generating the corresponding voice based on the narration text may be implemented by using a TTS technology. In addition, the present disclosure is applied to a scenario of real-time narration. Therefore, when the TTS technology is used for implementing text-to-speech conversion, text translation and speech output may be performed in parallel.

Figure 10:
FIG. 10 is a schematic diagram of an example of narration content outputted in an implementation scenario of online game virtual narration according to embodiment(s) of the present disclosure.

FIG. 10 is a schematic diagram of an example of narration content outputted in an implementation scenario of online game virtual narration according to an embodiment of the present disclosure. As shown in FIG. 10, the narration content includes a narration text 1001 in a subtitle form. The narration content may further include audio data used for broadcasting the narration text.

In the foregoing, the online virtual narration method according to the embodiment of the present disclosure is described in detail with reference to FIG. 1B to FIG. 10. By using the online virtual narration method according to the embodiment of the present disclosure, a problem of real-time online narration can be resolved. For a video (for example, an online game or a sports event) that is currently in progress, narration content may be outputted in real time and synchronously, and even a narration speech may be broadcast by a virtual narration host with a personification effect such as a corresponding expression or action.

Hereinafter, an online virtual narration device according to an embodiment of the present disclosure will be described with reference to FIG. 11.

Figure 11:
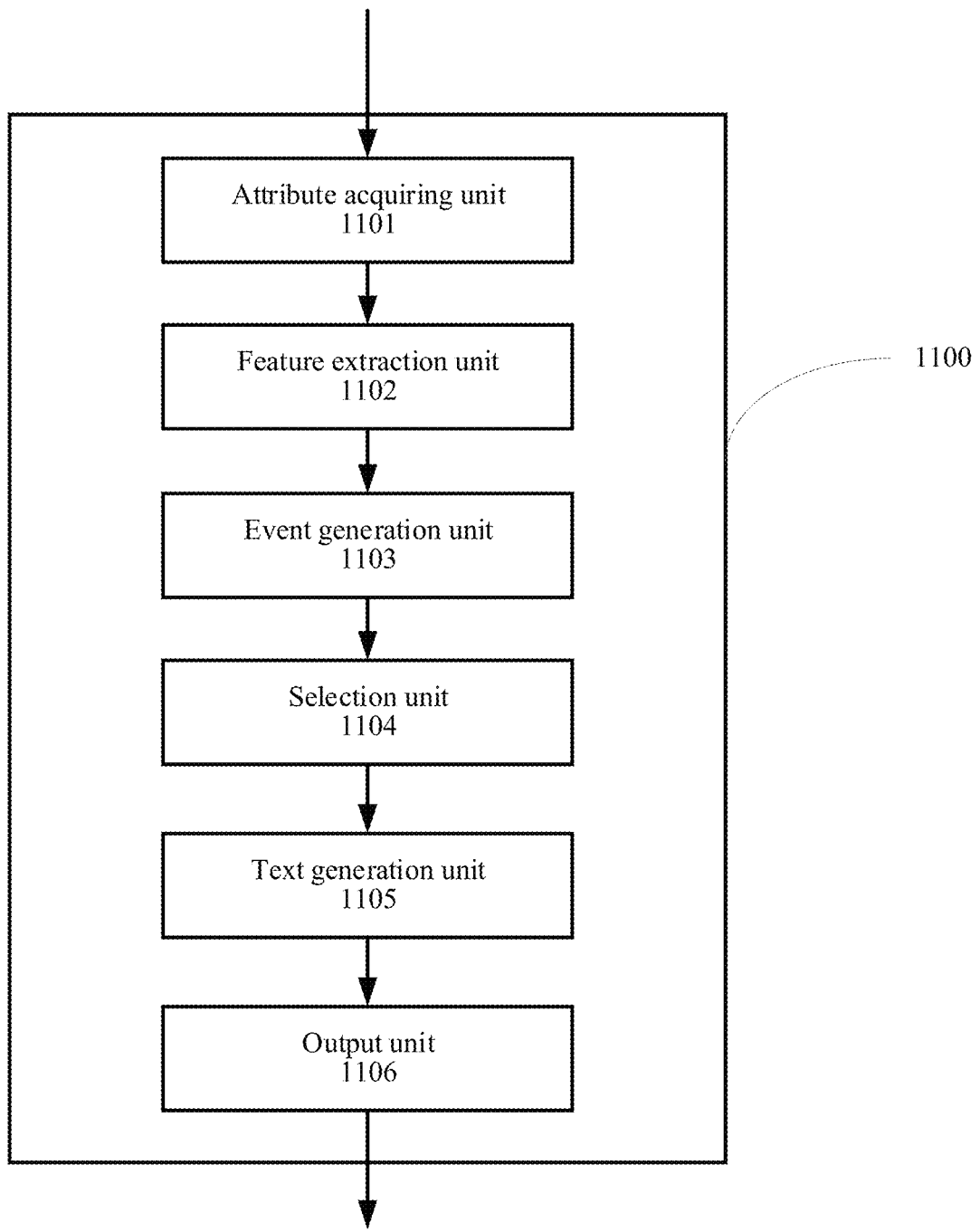
FIG. 11 is a schematic structural diagram of an online virtual narration device according to embodiment(s) of the present disclosure.

As shown in FIG. 11, the online virtual narration device 1100 includes an attribute acquiring unit 1101, a feature extraction unit 1102, an event generation unit 1103, a selection unit 1104, a text generation unit 1105, and an output unit 1106.

The attribute acquiring unit 1101 is configured to acquire, based on a frame image of a video being played, attribute data used for describing basic information of an element in the frame image. For example, the online virtual narration device according to this embodiment of the present disclosure may be applied to a scenario of online game virtual narration. In this implementation, the video being played is a video of an online game. A game player may input a game instruction to the online game to control, when the game is being performed, movement, skills, and actions of elements such as a player role and a non-player role. In addition, in this implementation, the attribute acquiring unit 1101 is further configured to: acquire, based on the frame image of the video being played and a frame instruction (such as the game instruction) inputted for the frame image, the attribute data used for describing the basic information of the element in the frame image.

For example, the attribute data includes direct attribute data and indirect attribute data. The attribute acquiring unit 1101 may be further configured to acquire direct attribute data of an element in a current frame image in a current frame. Herein, the direct attribute data is automatically generated by a game application. For example, the direct attribute data may include a coordinate position of a game role in an image. Then, the attribute acquiring unit 1101 determines the indirect attribute data by performing analysis processing on the direct attribute data of the element in the current frame image in the current frame. That is, the indirect attribute data is data further calculated based on the direct attribute data. For example, in the example, when or in response to determining that the direct attribute data includes the coordinate position of the game role in the image, indirect attribute data of "the game role in the jungle" may be obtained by comparing the coordinate position of the game role with a coordinate position of the jungle. In another implementation, based on the direct attribute data, the indirect attribute data may be obtained by understanding the game instruction. For example, if a game player inputs a game instruction for movement, based on a current coordinate position of a game role corresponding to the game player, a new coordinate position of the game role in the map after the game role moves may be calculated. Alternatively, for another example, if the game player inputs a game instruction for applying a spell, the remaining spell cooling time of the game role corresponding to the game player after the spell is applied may be calculated based on the current time.

In one implementation, in addition to considering only the direct attribute data of the current frame image, the indirect attribute data may be further acquired with reference to direct attribute data of images of one or more previous frames. In certain embodiment(s), the attribute acquiring unit 1101 may be further configured to acquire direct attribute data of an element in a current frame image in a current frame and a previous frame; and determine indirect attribute data by performing analysis processing on the direct attribute data of the element in the current frame image in the current frame and the previous frame. Herein, the previous frame is a frame that precedes the current frame in a time sequence, and a quantity of previous frames may be one or more. For example, the direct attribute data may include information boxes in game images in the current frame and the previous frame. By performing image analysis processing on the information boxes, hit point data of the game role in the game images in the current frame and the previous frame may be obtained, and the hit point data in the game image in the current frame is compared with the hit point data in the game image in the previous frame to determine indirect attribute data of "a hit point change amount of the game role".

For another example, the online virtual narration device according to this embodiment of the present disclosure may also be applied to a scenario of sports event virtual narration. In this implementation, the video being played is an ongoing sports event. Unlike an online game, a sports event may not receive an input from a user, that is, no inputted game instruction exists in each frame, and the sports event may be considered as an automatically played video. In addition, for each frame image, attribute data of an element in the image is obtained based on only the frame image. For example, when or in response to determining that the ongoing sports event is a basketball game, the direct attribute data may include a coordinate position of a player in a frame image. By comparing the coordinate position of the player with a coordinate position of each area of a basketball court, indirect attribute data of "the player is in the front court" can be obtained.

It may be learned that, for the attribute data acquired by the attribute acquiring unit 1101 based on the frame image of the video being played, both the directly acquired direct attribute data and the indirect attribute data obtained through further analysis based on the directly acquired direct attribute data are data used for describing basic information in a single dimension.

The feature extraction unit 1102 is configured to extract, based on the attribute data, feature data used for representing comprehensive information related to narration in the frame image. As described above, the direct attribute data and the indirect attribute data that are obtained based on the frame image may be reused for extracting different types of feature data. That is, when the feature extraction unit 1102 extracts different feature data, some of the used attribute data may be the same.

In certain embodiment(s), the feature extraction unit 1102 is further configured to select, from the attribute data, attribute data associated with each feature included in a pre-established narration feature library. For example, attribute data associated with a feature "whether in the grass" included in the narration feature library is coordinates of a game role and coordinates of the grass. Then, a value of the feature is determined as the feature data of the frame image by performing analysis processing on the attribute data associated with the feature. For example, by comparing the coordinates of the game role with the coordinates of the grass, it is determined that the value of the feature "whether in the grass" is "in the grass" or "not in the grass".

The following describes in detail a method for constructing a narration feature library.

A forward narration process is from attribute data to feature data, and then from the feature data to a narration event. However, the narration feature library is established based on a reverse narration process, that is, the narration feature library is gradually established and improved through disassembly from an event to a feature and then from the feature to an attribute for the narration event involved in the narration process, and by applying prior annotation and mining.

The online virtual narration device according to this embodiment of the present disclosure may further include a narration feature library construction unit (not shown in the figure), configured to establish the narration feature library through the following processing: extracting a reference narration text based on a reference narration video as a standard; determining a reference narration event based on the reference narration text; determining, based on the reference narration event, reference feature data used for representing comprehensive information related to narration; and establishing the narration feature library based on the reference feature data.

Herein, the reference narration video as the standard may be a video that has been manually narrated, such as a game video or a sports event. That is, in the reference narration video, outputted narration content is already included. It is expected to reversely derive, based on the existing reference narration video, which features are concerned in the narration process. Generally, in practice, a plurality of reference narration videos will be selected as standards. The more the selected reference narration videos are, the more complete the features included in the established narration feature library.

In addition, the established narration feature library is in a one-to-one correspondence with a specific type of a to-be-narrated video. For example, a narration feature library used for an online game and a narration feature library used for a sports event are necessarily different. In addition, in an implementation scenario of online game virtual narration, narration feature libraries corresponding to different types of online games are also different.

In certain embodiment(s), first, the narration feature library construction unit may extract a narration audio from the reference narration video, and then convert the extracted narration audio into a reference narration text. For example, the extracted reference narration text is "Shen Mengxi threw a hybrid bomb, causing huge damage. I really admire him."

Then, the narration feature library construction unit determines a reference narration event based on the reference narration text. As shown in the example, based on the reference narration text "Shen Mengxi threw a hybrid bomb, causing huge damage. I really admire him.", it can be determined that reference narration events are "Shen Mengxi threw a bomb" and "the bomb causes huge damage".

Next, the narration feature library construction unit determines, based on the reference narration event, reference feature data used for representing comprehensive information related to narration. For example, based on the reference narration event of "Shen Mengxi threw a bomb", reference feature data of "a name of a game role" and "an action of a game role" can be determined. Based on the reference narration event of "the bomb causes huge damage", reference feature data of "damage output to another game role" can be determined.

Finally, the narration feature library construction unit establishes the narration feature library based on the reference feature data.

A combination of manual annotation and automatic annotation may be used for determining the reference narration event from the reference narration text and to determine the reference feature data from the reference narration event. In certain embodiment(s), first, event extraction and feature annotation are performed on a batch of reference narration videos in a manual annotation manner, so as to initially establish the narration feature library. Then, a new batch of reference narration videos are used for replacement, and the new batch of reference narration videos are automatically annotated to perform event extraction and feature annotation. After automatic annotation, error correction and supplement are performed through manual check, so as to further expand and improve the narration feature library. In such alternate manual and automatic manners, a new reference narration video is constantly used for replacement. As processing progresses, fewer manual error correction and supplement parts will be found. When manual error correction and supplement parts are no longer present, this means that the narration feature library is generated and can be used in feature extraction of online virtual narration.

Because the narration feature library includes a large quantity of feature data, the feature data is classified into different categories for ease of retrieval and management. It can be learned that feature data of each category is calculated based on attribute data, which is a key to feature extraction.

In addition, it may be desirable to balance feature data included in the narration feature library and the quantity of the feature data included in the narration feature library. If the narration feature library includes as many categories and as much feature data as possible, a problem of omitting an event will not occur, but a computation amount generated for each frame of event will be greatly increased. If the narration feature library includes only a small quantity of key feature data, and an event generated based on these key feature data is to be selected as a narration event with a large probability, this greatly reduces a computation amount generated for each frame of event and improves real-time narration performance. Selection of the key feature data may be determined according to a specific narration scenario and depends on a plurality of experiments.

The event generation unit 1103 is configured to generate candidate events based on the feature data. The candidate events are events that occur in a video playback process. The candidate events generated herein are not necessarily all events that occur in the video playback process. Which candidate events are generated depends on which feature data has been extracted. In addition, not all the generated candidate events may be narrated.

In certain embodiment(s), the event generation unit 1103 is further configured to load conditions corresponding to some or all predefined events. One event may correspond to one or more conditions. For example, an event that "a hero is killed by a wild monster" may be corresponding to two conditions: C1. a hero is dead; and C2. killed by the wild monster. The event generation unit 1103 generates an event as a candidate event when or in response to determining, based on the feature data, that a condition corresponding to the event is met. For example, if a value of the extracted feature data indicates that a hero state is alive or a killer category is another hero, that is, the condition C1 and the condition C2 are not met at the same time, the event generation unit 1103 does not generate an event that "a hero is killed by a wild monster". If the value of the extracted feature data indicates that the hero state is killed and the killer category is a wild monster, that is, both the condition C1 and the condition C2 are met, the event generation unit 1103 generates an event that "a hero is killed by a wild monster", and uses the event as a candidate event.

In this manner, the event generation unit 1103 traverses conditions corresponding to some or all predefined events, and generates events whose corresponding conditions are met.

When implementation complexity of an event is relatively high, a quantity of conditions and feature data corresponding to the event increases. Therefore, in certain embodiment(s), from a perspective of implementation complexity, the candidate events are divided into a basic event and an advanced event. The event listed above that "a hero is killed by a wild monster" is a basic event. As described above, the event generation unit 1103 may generate a basic event based on the feature data. An advanced event is defined relative to a basic event. The event generation unit 1103 may generate an advanced event based on a basic event or may generate an advanced event based on a basic event and the feature data.

Because an advanced event can be combined by basic events, for those events with complex features and many conditions, they can be easily combined by basic events, which can not only avoid a problem of splitting into many game features, but also increase reuse rates of some or all events.

An advanced event H1 is described as an example that a support squats in the grass bush behind a tyrant and assists a jungle in attacking the dragon from a perspective of the jungle. For this advanced event, game features that are split directly include: F1. hero occupation—support, F2. tyrant state—attacked, F3. tyrant attacker occupation—jungle, and F4. support hero position—grass bush behind the tyrant. Previously, the following basic events have been defined and extracted: E1. a support squats in the grass bush behind a tyrant, and E2. a jungle hero is attacking the tyrant. Therefore, the event generation unit 1103 may directly form the advanced event H1 based on a combination of the basic events E1+E2, instead of defining a lengthy combination of F1, F2, F3, and F4, and performing a plurality of times of condition determining.

In the foregoing, events are divided into basic events and advanced events from a perspective of implementation complexity. There may be another manner of dividing the events. For example, from a perspective of an event feature, candidate events may be further divided into a teamfight event and a non-teamfight event. In certain embodiment(s), the teamfight event is a set of candidate events in which a plurality of game roles participate in a predetermined time period before a current frame, and the non-teamfight event is an event other than the teamfight event. The teamfight event and the non-teamfight event may be basic events, or may be advanced events. In addition, in terms of a time span of an event, the events may be divided into a single-frame event and a multi-frame event. The teamfight is performed based on a period of time in a game, game data exists in a form of a frame, and one game time period includes a plurality of game frames. Therefore, a teamfight event may be considered as a multi-frame event.

For each game frame, the attribute acquiring unit 1101, the feature extraction unit 1102, and the event generation unit 1103 separately perform procedures of attribute acquiring, feature extraction, and event generation. In addition, some or all the generated events are provided to a subsequent selection unit 1104 as candidate events.

The selection unit 1104 is configured to select a narration event from the generated candidate events. That is, only some of the candidate events are selected as narration events, and are narrated.

In certain embodiment(s), the selection unit 1104 is further configured to select the narration event based on a playback status of the video. For example, to enhance spot effects of narration, the candidate events generated by the event generation unit 1103 include an operation event to supplement an introduction to a video currently being played (for example, a game introduction or a sports event introduction), a news narration opening event, and the like. This type of event may be played during a time period (such as game loading, game pause, and halftime during a sports event) that is not related to narration. Therefore, when the playback status of the video is game pause or halftime during a sports event, the selection unit 1104 selects an operation event from the candidate events as a narration event (operation selection).

In addition to the event selection basis, the narration event may be selected in the following manner. In certain embodiment(s), the selection unit 1104 is further configured to: determine degrees of importance of the generated candidate events according to a predetermined rule; and select a candidate event with the highest degree of importance as the narration event. For example, in an implementation scenario of online sports event virtual narration, when a position in which a sports event occurs is in a central area of a picture, it is considered that importance of the candidate event is high. Alternatively, when the sports event causes a score change, it is considered that the candidate event is of high importance.

In addition, in an implementation scenario of online game virtual narration, the narration event may be selected in the following manner. As described above, the candidate events include a teamfight event and a non-teamfight event. The selection unit 1104 may be further configured to perform: determining a degree of importance of each teamfight event according to a predetermined rule when or in response to determining that a plurality of teamfight events exist in the predetermined time period, for example, based on a position of a participating game role, there are teamfight events in a region A, a teamfight in a region B, and a teamfight in a region C in the predetermined time period. Then, the selection unit 1104 selects a teamfight event with the highest degree of importance (teamfight selection). For example, a teamfight event bringing the largest quantity of kills has the highest degree of importance. Alternatively, a teamfight event applying the largest quantity of spells has the highest degree of importance. Alternatively, a teamfight event that appears in a narration field of view has the highest degree of importance.

Next, the selection unit 1104 determines, according to a predetermined rule, a degree of importance of each candidate event included in the selected teamfight event; and selects a candidate event with the highest degree of importance as the narration event (intra-team selection). For example, a score weighting may be performed according to a static weight of an event (for example, whether a game role is in the C position) and a dynamic weight of an event (for example, whether an event appears in a narration field of view, a result of a teamfight, and a spell effect), and an intra-team event with the highest score is selected as the narration event.

In addition, when or in response to determining that no teamfight event exists, the selection unit 1104 may directly select an event with the highest static weight from single-frame events as the narration event (out-of-team selection).

The predetermined rule is not limited to the examples. Any other possible rules shall also be included within the scope of the present disclosure.

The text generation unit 1105 is configured to determine a corresponding narration text based on the selected narration event. That is, after an event that may be narrated is determined, a narration word of the corresponding event may be generated.

In certain embodiment(s), the text generation unit 1105 may be further configured to: determine, based on a pre-established narration text library, a narration template corresponding to the selected narration event. The narration text library is essentially a set of (events, narration templates), and includes some or all narration stem content and a narration event corresponding to each of the narration templates. For example, a narration template [M1. <Hero Name>, do not worry. Take your medicine and save your strength.] corresponds to a narration event [E1. A hero uses a hit point supplement spell]. Then, the text generation unit 1105 replaces a template field in the narration template based on attribute data corresponding to the narration event, and generates the narration text. For example, the text generation unit 1105 dynamically uses the attribute data acquired by the attribute acquiring unit described above and a hero name-A Ke for replacement to obtain the narration text.

The output unit 1106 is configured to output corresponding narration content based on the narration text. The narration content herein may be a text, may be an audio, or may be a video.

In certain embodiment(s), the output unit is further configured to perform one or more of the following processing: outputting the narration text (subtitle narration); outputting a voice for broadcasting the narration text (audio narration); displaying a virtual image, and outputting a voice that cooperates with the virtual image to broadcast the narration text (virtual host video narration); and displaying a virtual image, and broadcasting the narration text by using an action of the virtual image (virtual host video narration), such as a sign language broadcast.

By using the online virtual narration device according to the embodiments of the present disclosure, a problem of real-time online narration can be resolved. For a video (for example, an online game or a sports event) that is currently in progress, narration content may be outputted in real time and synchronously, and even a narration speech may be broadcast by a virtual narration host with a personification effect such as a corresponding expression or action.

Figure 12:
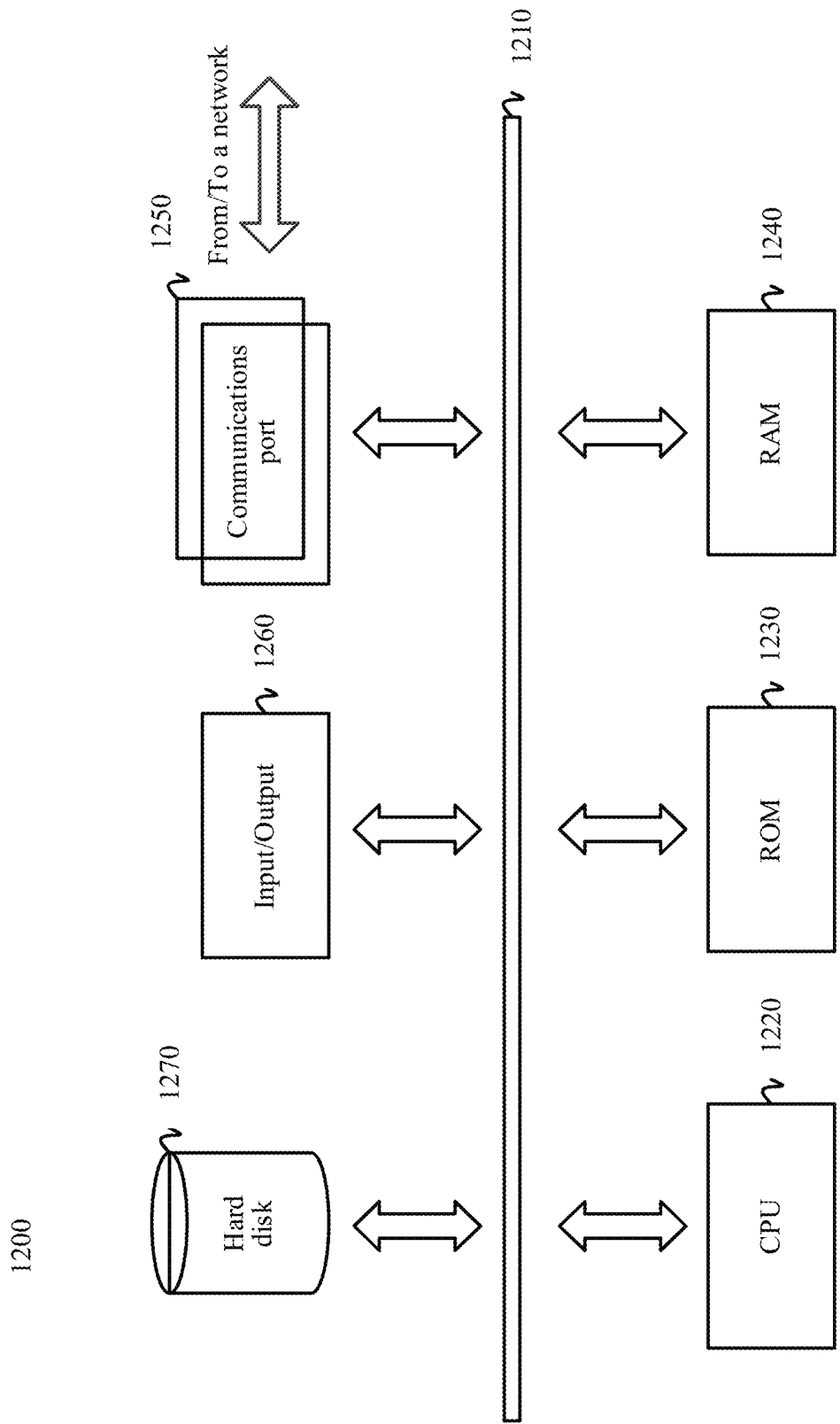
FIG. 12 is a schematic diagram of an architecture of an exemplary computing device according to embodiment(s) of the present disclosure.

In addition, according to an embodiment of the present disclosure, an online virtual narration device is provided, including: one or more processors and one or more memories, and the one or more memories storing a computer program, when executed by the one or more processors, causing the device to perform the online virtual narration method described above. In certain embodiment(s), the method or device according to the embodiments of the present disclosure may alternatively be implemented by using an architecture of a computing device 1200 shown in FIG. 12. As shown in FIG. 12, the computing device 1200 may include a bus 1210, one or more CPUs 1220, a read-only memory (ROM) 1230, a random access memory (RAM) 1240, a communication port 1250 connected to a network, an input/output component 1260, a hard disk 1270, and the like. A storage device, for example, the ROM 1230 or the hard disk 1270, in the computing device 1200 may store various data or files used in processing and/or communication in the image processing method according to the present disclosure and program instructions executed by the CPU. The architecture shown in FIG. 12 is only exemplary, and when different devices are implemented, one or more components in the computing device shown in FIG. 12 may be omitted.

The embodiments of the present disclosure may alternatively be implemented as a computer-readable storage medium. Computer-readable instructions (computer programs) are stored on the computer-readable storage medium according to an embodiment of the present disclosure. The computer-readable instructions, when executed by a processor of the computing device, cause the computing device to perform the online virtual narration method according to the embodiments of the present disclosure described with reference to the accompanying drawings. The computer-readable storage medium includes, but is not limited to, a volatile memory and/or a non-volatile memory. For example, the volatile memory may include a RAM and/or a high-speed cache. For example, the non-volatile memory may include a ROM, a hard disk, and a flash memory.

So far, the online virtual narration method and device according to the embodiments of the present disclosure are described with reference to FIG. 1B to FIG. 12. By using the online virtual narration method and device according to the embodiments of the present disclosure, a problem of real-time online narration can be resolved. For a video (for example, an online game or a sports event) that is currently in progress, narration content may be outputted in real time and synchronously, and even a narration speech may be broadcast by a virtual narration host with a personification effect such as a corresponding expression or action.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

In the present disclosure, the term "include", "comprise", or any other variant is intended to cover non-exclusive include, so that a process, a method, an article, or a device that includes a series of elements and that not only includes such elements, but also includes other elements not explicitly listed, or may further include elements inherent in the process, the method, the article, or the device. Unless otherwise specified, an element limited by "include . . . " does not exclude other same elements existing in the process, the method, the article, or the device that includes the element.

In addition, the series of processing not only include processing performed in the order described herein according to a time sequence, but also include processing performed in parallel or separately, rather than according to the time sequence.

Based on the description of the implementations, a person skilled in the art may clearly understand that the embodiments of the present disclosure may be implemented by using software in addition to a hardware platform, or may be implemented by using software only. Based on such an understanding, all or the part of the technical solutions of the embodiments of the present disclosure contributing to the technology in the background part may be implemented in the form of a software product. The computer software product may be stored in a storage medium, such as a ROM/RAM, a magnetic disk, or an optical disc, and includes several instructions for instructing a computing device (which may be a personal computer, a server, or a network device) to perform the method described in the embodiments or some parts of the embodiments of the present disclosure.

The embodiments of the present disclosure are described in detail above. The principles and implementations of the present disclosure are described through specific examples in the present disclosure, and the descriptions of the embodiments are only intended to help understand the methods and core ideas of the present disclosure. Meanwhile, a person of ordinary skill in the art may make modifications to the specific implementations and scopes according to the ideas of the present disclosure. The content of the present disclosure should not be construed as limiting.

What is claimed is:

1. An online virtual narration method, performed by a computing device, the method comprising:
   acquiring, at least based on a frame image of a video being played, attribute data used for describing basic information of an element in the frame image;
   extracting, based on the attribute data, feature data used for representing comprehensive information related to narration in the frame image;
   generating candidate events based on the feature data;
   selecting a narration event from the generated candidate events;
   determining a corresponding narration text based on the selected narration event; and
   outputting corresponding narration content based on the narration text, wherein outputting the narration content comprises one or more of: outputting the narration text; outputting a voice for broadcasting the narration text; displaying a virtual image, and outputting a voice that cooperates with the virtual image to broadcast the narration text; and displaying a virtual image, and broadcasting the narration text by using an action of the virtual image.

2. The method according to claim 1, wherein acquiring the attribute data comprises:
   acquiring, based on the frame image of the video being played and a frame instruction inputted for the frame image, the attribute data used for describing the basic information of the element in the frame image.

3. The method according to claim 1, wherein the attribute data includes direct attribute data and indirect attribute data, and wherein acquiring the attribute data comprises:
   acquiring direct attribute data of an element in a current frame image in a current frame; and
   determining indirect attribute data by performing analysis processing on a direct attribute of the element in the current frame image in the current frame.

4. The method according to claim 1, wherein the attribute data includes direct attribute data and indirect attribute data, and wherein acquiring the attribute data comprises:
   acquiring direct attribute data of an element in a current frame image in a current frame and a previous frame; and determining indirect attribute data by performing analysis processing on the direct attribute data of the element in the current frame image in the current frame and the previous frame.

5. The method according to claim 1, wherein extracting the feature data comprises:
selecting, from the attribute data, attribute data associated with each feature included in a narration feature library; and
determining a value of the feature as the feature data of the frame image by performing analysis processing on the attribute data associated with the feature.

6. The method according to claim 5, wherein the narration feature library is established by:
extracting a reference narration text based on a reference narration video as a standard;
determining a reference narration event based on the reference narration text;
determining, based on the reference narration event, reference feature data used for representing comprehensive information related to narration; and
establishing the narration feature library based on the reference feature data.

7. The method according to claim 1, wherein generating the candidate events comprises:
loading conditions corresponding to predefined events; and
generating an event as a candidate event in response to determining, based on the feature data, that a condition corresponding to the event is met.

8. The method according to claim 1, wherein the candidate events include a basic event and an advanced event, the basic event is generated based on the feature data, and the advanced event is generated based on the basic event or based on the basic event and the feature data.

9. The method according to claim 1, wherein selecting the narration event comprises:
selecting the narration event based on a playback status of the video.

10. The method according to claim 1, wherein selecting the narration event comprises:
determining degrees of importance of the generated candidate events according to a predetermined rule; and
selecting a candidate event with the highest degree of importance as the narration event.

11. The method according to claim 1, wherein the video being played is an online game, the candidate events include a teamfight event and a non-teamfight event, the teamfight event includes a set of candidate events in which a plurality of game roles participate in a predetermined time period before a current frame, and the non-teamfight event is an event other than the teamfight event.

12. The method according to claim 11, wherein selecting the narration event comprises:
determining a degree of importance of each teamfight event according to a predetermined rule in response to determining that a plurality of teamfight events exist in the predetermined time period;
selecting a teamfight event with the highest degree of importance;
determining, according to a predetermined rule, a degree of importance of each candidate event comprised in the selected teamfight event; and
selecting a candidate event with the highest degree of importance as the narration event.

13. The method according to claim 1, wherein determining the narration text comprises:
determining, based on a narration text library, a narration template corresponding to the selected narration event; and
replacing a template field in the narration template based on attribute data corresponding to the narration event, and generating the narration text.

14. An online virtual narration device, comprising: a memory storing computer program instructions; and a processor coupled to the memory and configured to execute the computer program instructions and perform:
acquiring, at least based on a frame image of a video being played, attribute data used for describing basic information of an element in the frame image;
extracting, based on the attribute data, feature data used for representing comprehensive information related to narration in the frame image;
generating candidate events based on the feature data;
selecting a narration event from the generated candidate events;
determining a corresponding narration text based on the selected narration event; and
outputting corresponding narration content based on the narration text, wherein outputting the narration content comprises one or more of: outputting the narration text; outputting a voice for broadcasting the narration text; displaying a virtual image, and outputting a voice that cooperates with the virtual image to broadcast the narration text; and displaying a virtual image, and broadcasting the narration text by using an action of the virtual image.

15. The online virtual narration device according to claim 14, wherein acquiring the attribute data includes:
acquiring, based on the frame image of the video being played and a frame instruction inputted for the frame image, the attribute data used for describing the basic information of the element in the frame image.

16. The online virtual narration device according to claim 14, wherein the attribute data includes direct attribute data and indirect attribute data, and wherein acquiring the attribute data includes:
acquiring direct attribute data of an element in a current frame image in a current frame; and
determining indirect attribute data by performing analysis processing on a direct attribute of the element in the current frame image in the current frame.

17. The online virtual narration device according to claim 14, wherein the attribute data includes direct attribute data and indirect attribute data, and wherein acquiring the attribute data includes:
acquiring direct attribute data of an element in a current frame image in a current frame and a previous frame; and
determining indirect attribute data by performing analysis processing on the direct attribute data of the element in the current frame image in the current frame and the previous frame.

18. The online virtual narration device according to claim 14, wherein extracting the feature data includes:
selecting, from the attribute data, attribute data associated with each feature included in a narration feature library; and
determining a value of the feature as the feature data of the frame image by performing analysis processing on the attribute data associated with the feature.

19. A non-transitory computer-readable storage medium storing computer program instructions executable by at least one processor to perform:
- acquiring, at least based on a frame image of a video being played, attribute data used for describing basic information of an element in the frame image;
- extracting, based on the attribute data, feature data used for representing comprehensive information related to narration in the frame image;
- generating candidate events based on the feature data;
- selecting a narration event from the generated candidate events;
- determining a corresponding narration text based on the selected narration event; and
- outputting corresponding narration content based on the narration text, wherein outputting the narration content comprises one or more of: outputting the narration text; outputting a voice for broadcasting the narration text; displaying a virtual image, and outputting a voice that cooperates with the virtual image to broadcast the narration text; and displaying a virtual image, and broadcasting the narration text by using an action of the virtual image.

* * * * *